US009295092B2

(12) United States Patent
Kaur et al.

(10) Patent No.: US 9,295,092 B2
(45) Date of Patent: Mar. 22, 2016

(54) METHOD AND APPARATUS FOR A MULTI-RADIO ACCESS TECHNOLOGY LAYER FOR SPLITTING DOWNLINK-UPLINK OVER DIFFERENT RADIO ACCESS TECHNOLOGIES

(75) Inventors: Samian Kaur, Conshohocken, PA (US); Alexander Reznik, Titusville, NJ (US); Douglas R. Castor, Norristown, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 434 days.

(21) Appl. No.: 12/859,863

(22) Filed: Aug. 20, 2010

(65) Prior Publication Data

US 2011/0044218 A1 Feb. 24, 2011

Related U.S. Application Data

(60) Provisional application No. 61/235,791, filed on Aug. 21, 2009.

(51) Int. Cl.
*H04B 7/00* (2006.01)
*H04W 76/02* (2009.01)
*H04W 88/06* (2009.01)

(52) U.S. Cl.
CPC ............ *H04W 76/026* (2013.01); *H04W 88/06* (2013.01)

(58) Field of Classification Search
USPC ......................................................... 370/310
See application file for complete search history.

(56) References Cited

U.S. PATENT DOCUMENTS

| 7,065,376 | B2 | 6/2006 | Wolman et al. | |
|---|---|---|---|---|
| 7,808,961 | B2 | 10/2010 | Ishii et al. | |
| 7,965,676 | B2 | 6/2011 | Dimou et al. | |
| 8,265,551 | B2 | 9/2012 | Saito et al. | |
| 2003/0078037 | A1 | 4/2003 | Auckland et al. | |
| 2003/0112144 | A1* | 6/2003 | Campman | 340/573.1 |
| 2005/0044387 | A1 | 2/2005 | Ozolins | |
| 2005/0254454 | A1* | 11/2005 | Ozluturk | 370/328 |
| 2007/0183461 | A1* | 8/2007 | Eyal et al. | 370/503 |
| 2007/0211675 | A1 | 9/2007 | Jain et al. | |
| 2008/0080536 | A1* | 4/2008 | Chhaya et al. | 370/401 |
| 2009/0086704 | A1* | 4/2009 | Ho | 370/346 |
| 2009/0122765 | A1 | 5/2009 | Dimou et al. | |
| 2009/0280815 | A1* | 11/2009 | Roberts | 455/436 |

(Continued)

FOREIGN PATENT DOCUMENTS

CN 1622548 A 6/2005
JP 10145290 A2 5/1998

(Continued)

OTHER PUBLICATIONS

Bellec, et al., "Inter-MAC Concept for Gbps Home Network," Omega White Paper, ICT-213311, Apr. 9, 2009.

Dimou et al., "Generic Link Layer: A Solution for Multi-Radio Transmission Diversity in Communication Networks Beyond 3G," IEEE Vehicular Technology Conference, vol. 3, pp. 1672-1676 (Sep. 2005).

Gunnar, et al., "Access and Path Selection in Ambient Networks," Mobile and Wireless Communications Summit, Budapest, pp. 1-5, Jul. 1-5, 2007.

Sachs et al., "Migration of Existing Access Networks Towards Multi-Radio Access," IEEE Vehicular Technology Conference, pp. 1-5 (Sep. 2006).

(Continued)

*Primary Examiner* — Sulaiman Nooristany
(74) *Attorney, Agent, or Firm* — Condo Roccia Koptiw LLP

(57) ABSTRACT

A multi radio access technology layer (MRL) is a convergence layer solution, located between the protocol layers and the technology-dependent MAC layers. The MRL layer is technology independent and uses the information received from the underlying technologies to select the most appropriate uplink and downlink technologies to match the respective service requirements.

8 Claims, 10 Drawing Sheets

(56) References Cited

U.S. PATENT DOCUMENTS

| | | | | |
|---|---|---|---|---|
| 2010/0015967 A1* | 1/2010 | Perets et al. | | 455/422.1 |
| 2010/0056137 A1* | 3/2010 | Kamei | | 455/426.1 |
| 2010/0197223 A1* | 8/2010 | Saito et al. | | 455/23 |

FOREIGN PATENT DOCUMENTS

| | | |
|---|---|---|
| JP | 2003-78580 A | 3/2003 |
| JP | 2007-503047 A | 2/2007 |
| JP | 2007-537671 A | 12/2007 |
| JP | 2008-532393 A | 8/2008 |
| JP | 2009-529838 A | 8/2009 |
| WO | 2004062137 A1 | 7/2004 |
| WO | WO 2005/020036 A2 | 3/2005 |
| WO | 2005/115020 | 12/2005 |
| WO | WO 2006/109462 A1 | 10/2006 |
| WO | 2008116324 A1 | 10/2008 |
| WO | 2009008528 A2 | 1/2009 |
| WO | WO 2009/011135 A1 | 1/2009 |
| WO | 2010/129865 | 2/2011 |

OTHER PUBLICATIONS

Sigle et al., "Multi-Radio Infrastructure for 4G," Bell Labs Technical Journal, vol. 13, No. 4, pp. 257-276 (Dec. 2008).

Gunnar, et al., "Access and Path Selection in Ambient Networks," Mobile and Wireless Communications Summmit, Budapest, pp. 1-5, Jul. 1-5, 2007.

Melia et al., "Logical Interface Support for multi-mode IP Hosts", Netext WG, (Oct. 31, 2011).

Duros, et al. "A Link-Layer Tunneling Mechanism for Unidirectional Links", Network Working Group, (Mar. 2001).

Koudouridis et al., "Generic Link Layer Functionality for Multi-Radio Access Networks," 2005 IST Mobile and Wireless Communications Summit, pp. 1-5 (Jun. 30, 2005).

\* cited by examiner

METHOD AND APPARATUS FOR A MULTI-RADIO ACCESS TECHNOLOGY LAYER FOR SPLITTING DOWNLINK-UPLINK OVER DIFFERENT RADIO ACCESS TECHNOLOGIES

CROSS REFERENCE TO RELATED APPLICATION

This application claims the benefit of U.S. Provisional Patent Application No. 61/235,791, filed on Aug. 21, 2009, the content of which is hereby incorporated by reference herein.

BACKGROUND

Wireless communications typically use a single radio access technology (RAT) for both data and control information. This is a convenient and easy to manage technique for wireless communications in that it is only necessary to monitor and control a single RAT. However, modern wireless devices are often capable of supporting more than one RAT, thus efficiencies may be gained by separating or dedicating at least some data and control transmissions to specific RATs or channels.

SUMMARY

A multi radio access technology layer (MRL) is disclosed. The MRL is a convergence layer solution, located between the protocol layers and the technology-dependent MAC layers. The MRL layer is technology independent and uses the information received from the underlying technologies to select the most appropriate uplink and downlink technologies to match the respective service requirements.

BRIEF DESCRIPTION OF THE DRAWINGS

A more detailed understanding may be had from the following description, given by way of example in conjunction with the accompanying drawings wherein.

DETAILED DESCRIPTION

Figure 1A:
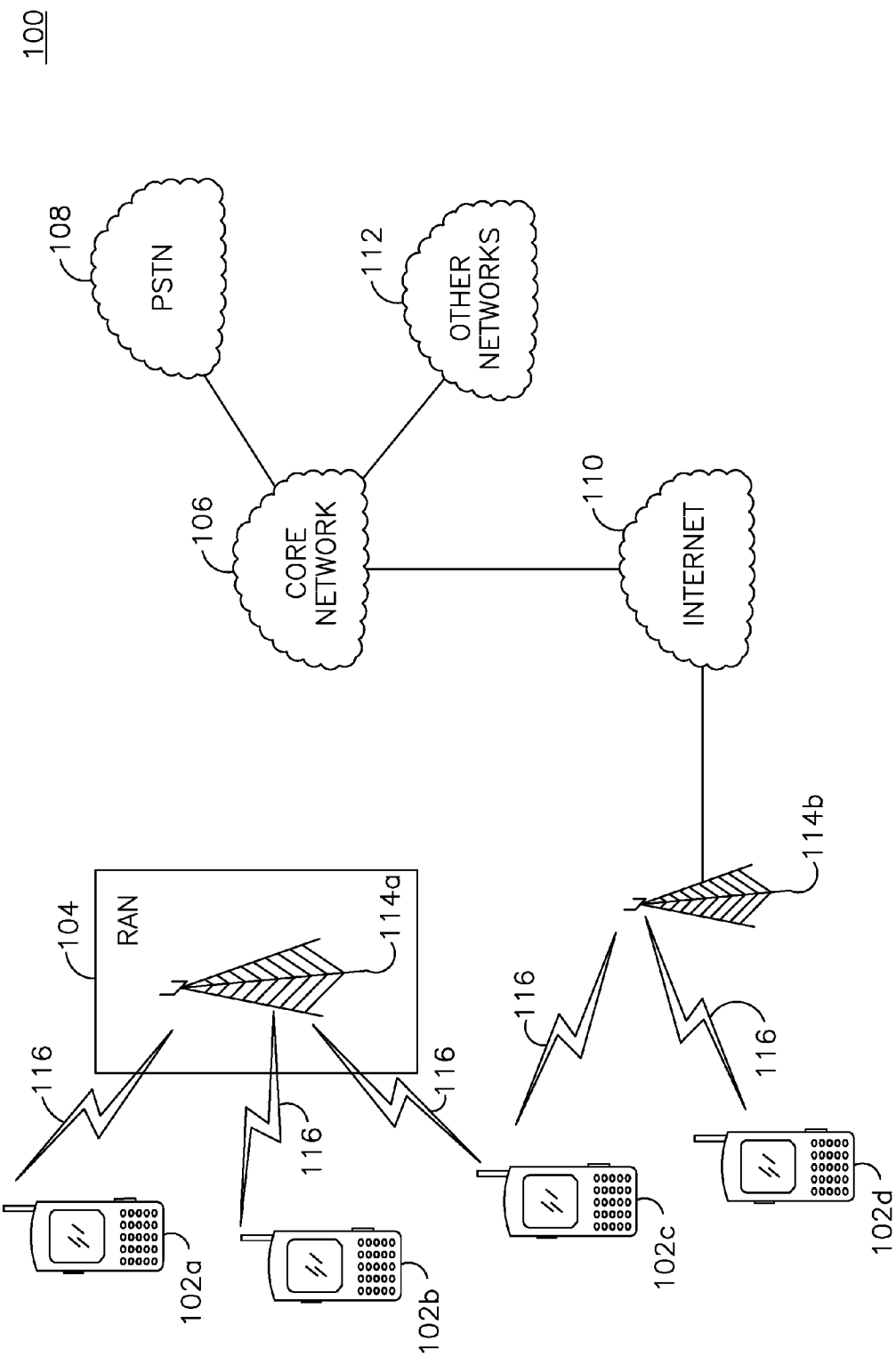
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which also may include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology, such as evolved UMTS terrestrial radio access (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1X, CDMA2000 EV-DO, interim standard 2000 (IS-2000), interim standard 95 (IS-95), interim standard 856 (IS-856), global system for mobile communications (GSM), enhanced data rates for GSM evolution (EDGE), GSM EDGE (GE-RAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
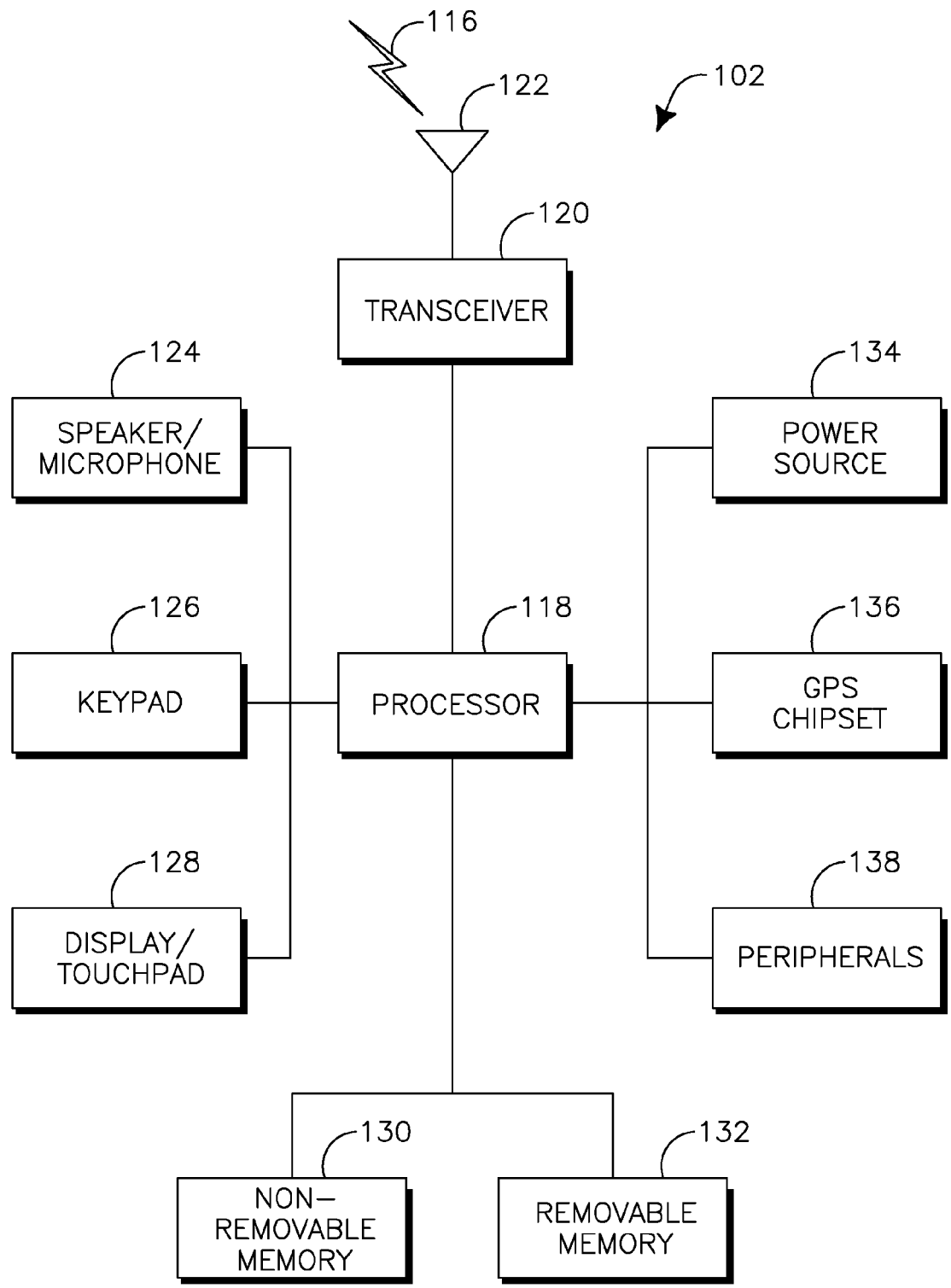
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, application specific integrated circuits (ASICs), field programmable gate array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 114a or 114b may be associated with a particular cell (not shown) and may be configured to handle radio resource management decisions, handover decisions, scheduling of users in the uplink and/or downlink, and the like. As shown in FIG. 1A, the eNode-Bs 140a, 140b, 140c may communicate with one another over an X2 interface.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

A multi radio access technology layer (MRL) is disclosed herein. The MRL is a convergence layer solution, located between the upper protocol layers and the technology-dependent MAC layers. The MRL layer is technology-independent and uses the information received from the underlying technologies to select the most appropriate uplink and downlink technologies to match the respective service requirements.

The capability to transmit on the downlink using one radio access technology (RAT) and on the uplink using a completely different RAT may provide some advantages (for example, transmitting layer 2 frames using one RAT in the uplink and a different RAT in the downlink). Such transmissions may also occur in different spectra. In one scenario, the utilization of long term evolution (LTE) spectrum for 802.11 communications in the downlink may be a viable alternative for the downlink (DL), while 802.11 transmission methods may be advantageous for the uplink (UL). Alternatively, LTE may be used in the DL of the LTE spectrum and 802.11 in the UL either the LTE spectrum or in the unlicensed spectrum where 802.11 traditionally operate.

Using a primary RAT for control and multiplexing data between the primary RAT transport channel and an alternative RAT (for example, 802.11 or VLC) may be also useful to: a) offload network resources; and b) mitigate interference in one direction. For example, in cellular frequency division duplex (FDD) systems, if a non-cellular RAT is used for the uplink, the network may use the unused uplink frequency bands for supporting more users or higher bandwidth.

Additionally, a femtocell may use a non-cellular RAT in certain situations for downlink in an effort to mitigate interference issues or physical cell identity (PCI) confusion with a macrocell. Embodiments to complement a primary RAT with an additional secondary link, in various hybrid topology configurations are also described herein.

To enable these functionalities, a multi-RAT layer (MRL) may be defined as a new component of the traditional protocol architecture, for example the MAC layer, in wireless communication systems. Furthermore, the MRL may have service access points (SAPs) from the underlying technology dependent medium access control (MAC) layers including at least one of those described below. A SAP is a conceptual location at which one communications layer can request the services of another communications layer (for example, the layers in the OSI reference model).

A multi-RAT scheduler to schedule data on different RATs (and may be responsive to the capabilities of each RAT) to provide for the respective quality of service (QoS) demands of a single RAT-unaware service (e.g., an Internet protocol (IP) connection, logical link control (LLC) connection, etc.).

A data layer is provided to present a single "effective" duplex RAT to the higher layers.

A control path is provided to encapsulate and transmit MAC control frames from downlink to uplink.

A time synchronization function is provided to maintain timing guarantees between uplink and downlink transmissions and control frames and a status indication is provided to identify link availability, quality, and synchronization status.

Furthermore, it may be necessary to receive control and feedback packets from the downlink MAC and have SAPs in the uplink MAC encapsulate the control and feedback packets and input them into the uplink MAC scheduler. To achieve this, a new encapsulated protocol identifier (ID) (MRL Protocol ID) may be defined for encapsulating all the feedback packets. A typical cellular system such as a LTE system may support logical channels which may be acknowledged (ACK) or unacknowledged (NACK). The logical channels may be mapped into transport channels which utilize physical channels (typically a shared physical channel) for the transmission of data. The transport and the physical channels may employ hybrid automatic repeat request (HARQ) processing which may generate ACK/NACKs. The HARQ ACK/NACKs may be encapsulated and sent over another RAT in an embodiment that implements inter-RAT ACK/NACK transmission.

In a typical cellular system, this may be accomplished by defining a logical channel (or using an existing common one) for transmission of ACK/NACK, such that the channel is using the unacknowledged mode, or by mapping the logical channel to a transport channel which does not generate ACK/NACK feedback for transmissions on physical channels. Mapping the logical channel to a transport channel may be accomplished by configuring the transport channel with a re-transmission count of 0, by using a type of transport channel which does not generate re-transmissions (i.e., a multicast channel such as those used for multi-media broadcast), or by defining a new type of transport channel for transmission of ACK/NACK information.

When ACK/NACK is transmitted using a shared physical channel, the ACK/NACK needs to be scheduled with high-priority so that the ACK/NACK feedback is not delayed by other data which may be transmitted over the link.

In one example, an 802.11 based WLAN system (including the quality of service (QoS) enhancement defined in the IEEE 802.11e amendment to the standard) supports multiple media access control (MAC) queues. In this example, a queue specifically for ACK/NACK re-transmission may be defined and assigned a high priority in order to support timely transmission of ACK/NACKs. The MAC bursts transmitted from this queue may be configured to indicate that no ACK/NACK transmission is required in response to their reception. Such a queue may be enabled to use a ready to send (RTS)/clear to send (CTS) mechanism to minimize a collision interfering with an ACK/NACK transmission. Moreover, a block ACK/NACK (such as defined in the IEEE 802.11n amendment) may be used to minimize the load ACK/NACK transmission places on the network.

Figure 2:
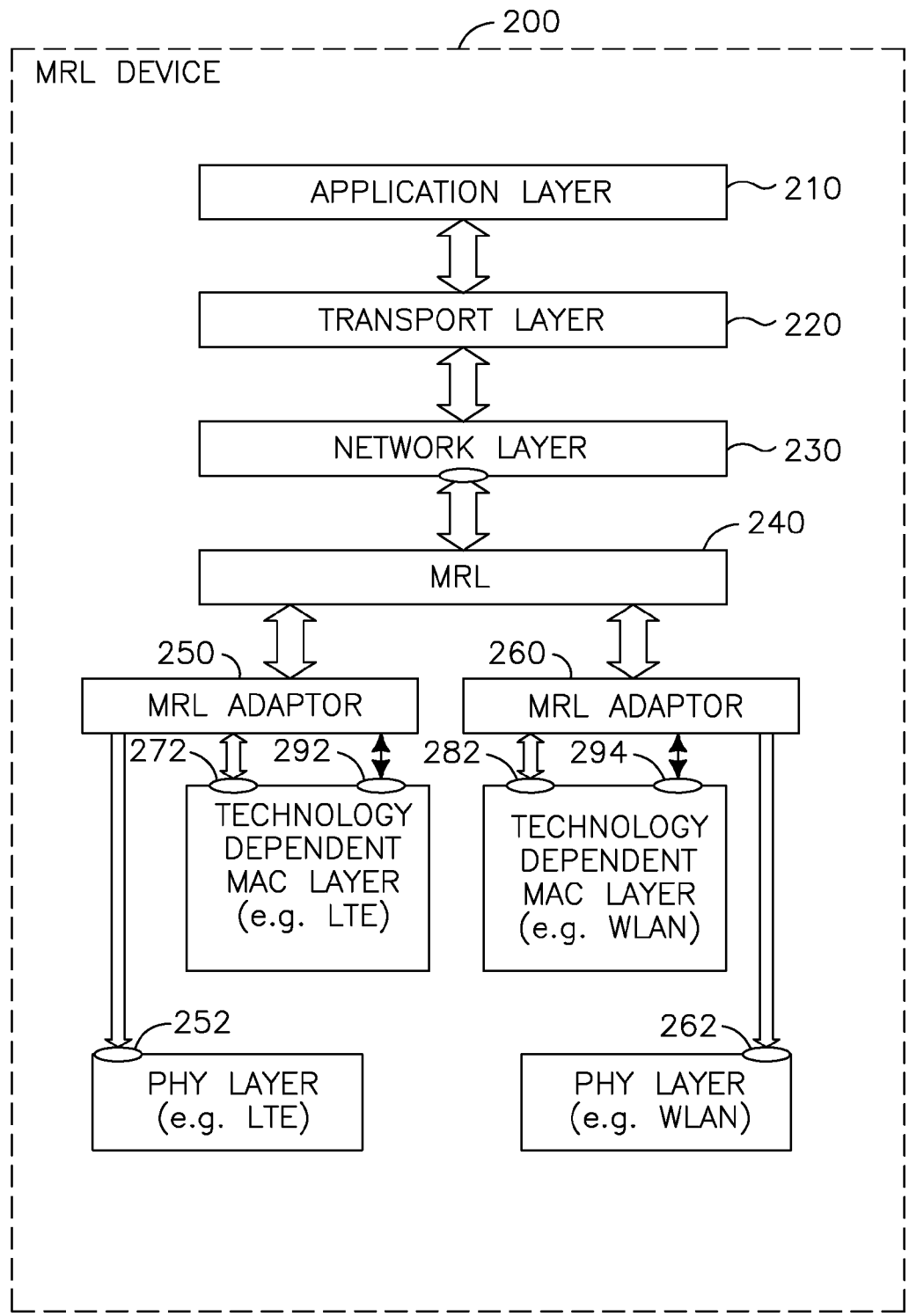
FIG. 2 shows how an MRL architecture fits into an OSI reference model.

FIG. 2 illustrates a protocol architecture of a multiple RAT capable MRL device (200) (for example, a WTRU or base station). The protocol architecture includes the following layers that may be used in both UL and DL transmissions: an application layer 210, a transport layer 220, a network layer 230, an MRL 240, a first MRL adapter 250 coupled to a first technology dependent MAC layer (for example, LTE), a second MRL adapter 260 coupled to a second technology dependent MAC layer (for example, WLAN). While two MRL adapters are described in this example, the number of MRL adapters is only limited by the number of RATs supported by the MRL device (200).

The application layer 210 is the main interface for a user to interact with the MRL device. Some examples of application layer implementations include hypertext markup language (HTML), Telnet, file transfer protocol (FTP), and simple mail transfer protocol (SMTP).

The transport layer 220 provides transparent transfer of data between end users, providing reliable data transfer services to the upper layers. The most common example of transport layer protocols are transport control protocol (TCP) and user datagram protocol (UDP).

The network layer 230 is responsible for routing of data packets through the network and handles the addressing and delivery of data. The network layer 230 provides congestion control, accounting information for the network, routing, addressing, and several other functions. Internet protocol (IP) is one common example of a network layer protocol.

The MRL 240 component performs various functionalities, such as an abstraction of flows into a plurality of downlink and uplink channels, decision making to monitor and map service requirements to a RAT, and timing management to ensure that the individual RAT's feedback and the timing requirements are being met.

The MRL adapters (250, 260) include the SAPs (251, 254, and 261) that allow the control (commands and feedback) and data (user-plane traffic) to and from the MRL to be forwarded to the underlying RATs using a RAT-specific abstraction. The commands sent from the MRL entity may include commands that may facilitate MRL decisions and operation, including commands for resource allocation, connection establishment, configuration request feedback information, query for channel quality, and the like. User-plane data (i.e., data from the application layer 210) is received from the higher-layers and sent to the technology independent RAT layers with minimal processing through the MRL entity 240, possibly including re-ordering, multiplexing and segmentation, if required at the MRL entity 240.

The descriptions below describe the SAP and data flow interfaces.

MRL PHY Control SAP (MRL to PHY) (252, 262): Configuration and control of PHY. Redirection of power control signals from one PHY to the other. PHY timing information for synchronization performed by the MRL.

MRL MAC Control SAP (MRL to MAC) (292, 294): Configuration and control of MAC. These primitives include information about which logical and/or transport channels are redirected across the other RAT. Also, primitives may exist for redirected MAC level feedback, including HARQ (ACK/NACK), channel quality information, grants, buffer status reports, and measurement signaling, or any other RAT specific MAC level signal defined in the appropriate standard (e.g., 3GPP LTE 36.321, IEEE 802.11, etc.). These signals may be redirected under MRL to support splitting downlink and uplink over different RATs.

MRL MAC Data SAP (MRL Adaptor to MAC 272, 282): This includes transport channel data which has been mapped to the individual RAT under the configuration maintained by the MRL management and control. This may include encapsulated data as well as de-encapsulated data.

Figure 3:
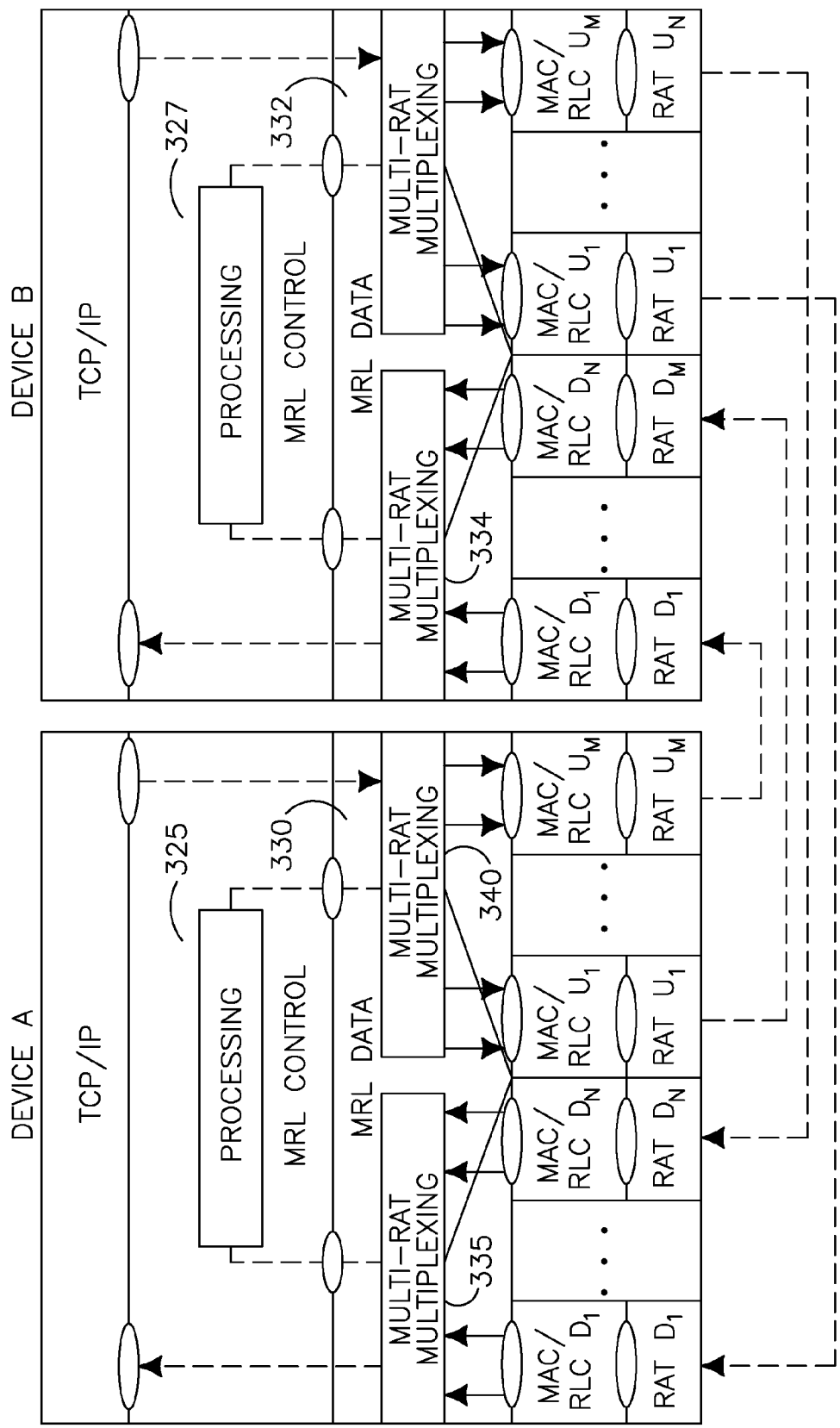
FIG. 3 shows a diagram of a multi-RAT architecture and its respective components.

Referring to FIG. 3, the multi-RAT layer (MRL) data layer (330, 332) includes a MRL data entity (not shown) that presents a "single effective connection" to the higher layers which maps to each RAT. This entity addresses inherent asymmetries in the RAT capabilities. The devices A and B (310 and 320) shown may represent a base station, access point (AP) or wireless transmit/receive unit (WTRU).

The MRL data layer (330, 332) may perform direct translation of packets when MAC or physical (PHY) layer encapsulated packets exist. Another purpose of this layer (330, 332) is to provide spectrum aggregation and an abstraction, referred to as multi-RAT multiplexing (335, 340, 332, 334) to allow user plane data to be channeled into one or more of the available RATs based on status information from the RATs and control information configured from the layers above. RAT priority is part of the control information. The UL and DL may be configured differently, but in terms of capabilities described herein, they are the equivalent. An example may be a visible light communication (VLC) link that complements an existing 802.11 service. In this case, downlink data may be prioritized over the VLC link to provide higher throughput to the user and reduce interference within the 802.11 system to neighboring users.

The MRL control layer (325, 327) is the processing and encapsulation layer for MRL control frames. The MRL control layer receives one or more MRL control frames from the downlink MAC, processes them and suitably sends them to the uplink MAC for handling.

Figure 4:
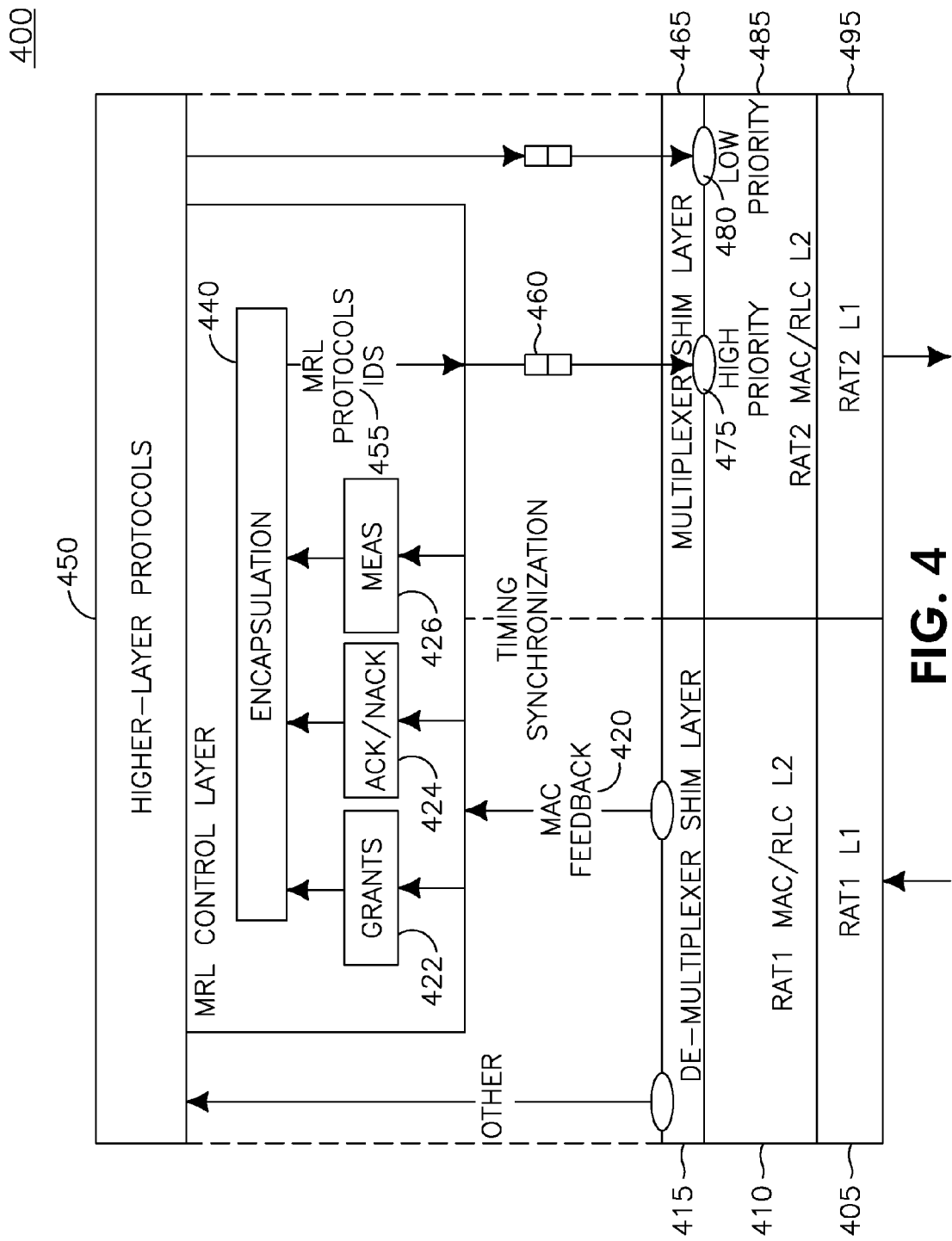
FIG. 4 shows an example MRL architecture.

FIG. 4 shows an example MRL architecture (including an MRL entity). The architecture shown in FIG. 4 may be found in any MRL device, such as a WTRU or base station. Referring to FIG. 4, the MRL protocol ID (455) is a protocol identifier used in encapsulating control and feedback messages including ACK/NACK messages (424), grants sent for uplink transmission (422), including grants for time, bandwidth, power control, measurement report indications (426), uplink buffer status reports (BSR), channel quality indicator (CQIs) reports, etc. The UL MAC (RAT2 MAC (485)) identifies at least one MRL Protocol ID (455) and creates at least one SAP to input the MRL Protocol IDs (455) to the MRL control layer (440). These SAPs may include interfaces that provide the control and feedback information described above. Still referring to FIG. 4, MRL timing (457) ensures that data, and the control and feedback, are scheduled in such a way that the requirements and assumptions of the other RATs are maintained.

For example, knowledge of frame timing is essential to comply with resource allocations. Also, RATs that require synchronized HARQ need knowledge of the timing to distinguish feedback for each HARQ queue. In some instances, the MRL timing (457) may maintain timers to ensure (coordinate) control and feedback information are transmitted within the RAT-specific timing constraints.

For example, a RAT1 (405, 410) expects to receive an ACK/NACK for a transmitted packet within a particular time period. A RAT2 (485, 495) will encapsulate this ACK/NACK as a "regular" MAC protocol data unit (PDU), and ensure the PDU gets scheduled for transmission at the correct time. Furthermore, the RAT2 (485, 495) may need to schedule the transmission using an "unacknowledged mode" (i.e., using a communication mode which itself does not generate an ACK/NACK). Similarly, the RAT1 (405, 410) will expect a retransmission at a particular time, which means that the MRL entity on the data transmission side (which is receiving ACK/NACK) must be configured to receive and process the transmissions (using RAT2 (485, 495)) in such a way that the ACK/NACK latency constraint of RAT1 (405, 410) is met.

The multiplexer and de-multiplexer MRL Shim layers (415, 465) provide the necessary functionality and abstraction to support spectrum aggregation, allowing data to be channeled on one or more underlying RATs. The MRL Shim layers also create an abstraction layer that allows the MRL entity to obtain QoS prioritization from the underlying RAT to support multiple traffic classes with different priorities, but at a minimum, high (475) and normal priority (480) traffic classes For example, LTE supports several traffic classes including guaranteed bit rate, best effort, conversational voice, and so on. High priority traffic class should be mapped to a traffic class offering minimum latency and user-plane traffic may be classified as a normal priority traffic class. Alternatively, the MRL entity may have requested a RAT-specific configuration of a traffic class to be used for user-plane traffic based on a requested QoS from the higher layers. The MRL entity (400) may optionally transmit the control and feedback information (also referred as MAC feedback (420)), encapsulated using a MRL protocol ID (455), over the high priority traffic queue (460), and the user-plane traffic over the normal priority traffic queue (462).

Figure 5:
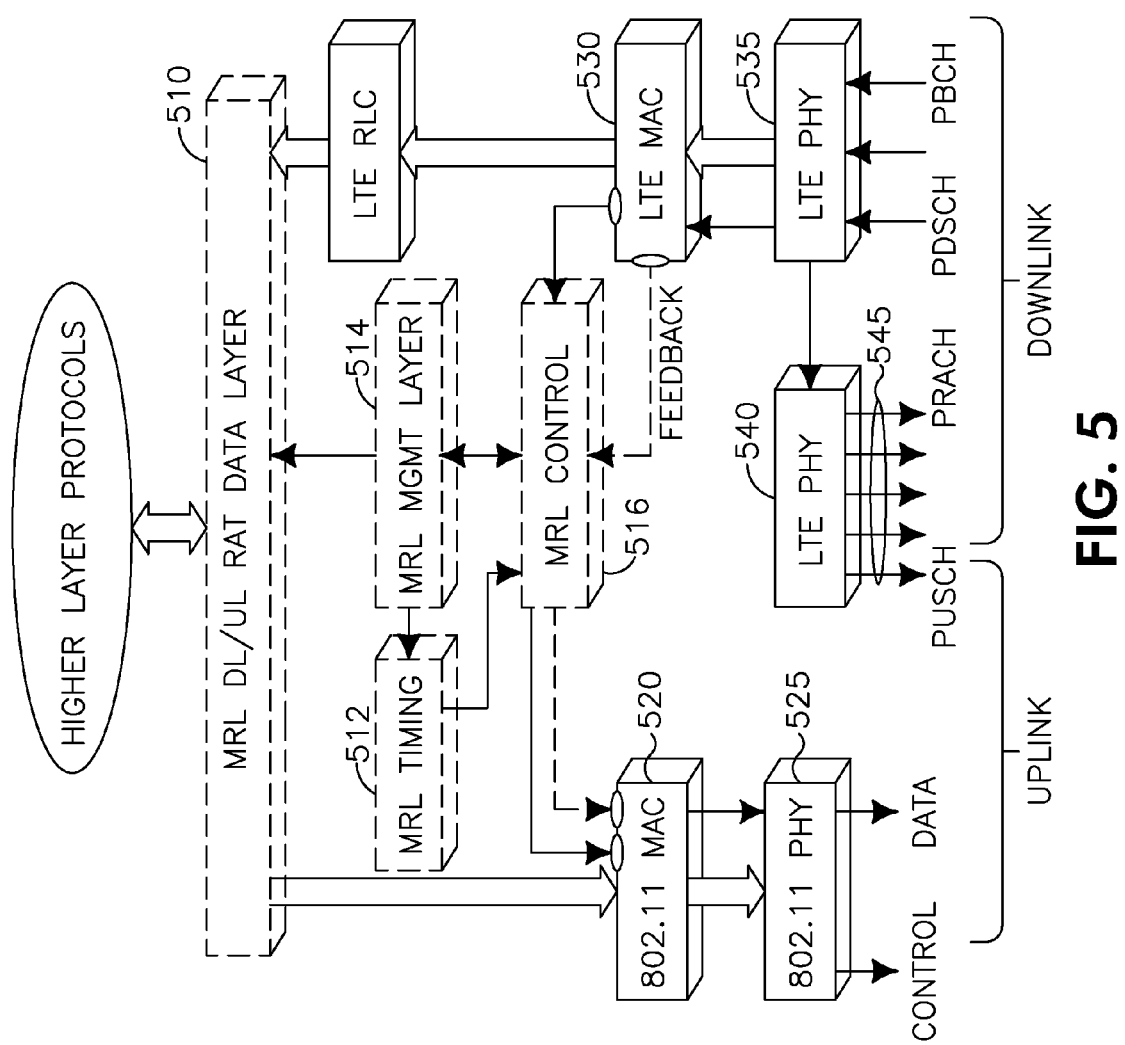
FIG. 5 shows a diagram of a multi-RAT architecture using 802.11 uplink and long term evolution (LTE) downlink parameters.

A wireless transmit/receive unit (WTRU) comprising a cellular RAT (e.g., LTE) in the downlink (DL) (530, 535) and an 802.11 RAT in the uplink (UL) (520,525) is illustrated in FIG. 5. The WTRU further comprises an MRL entity including an MRL data layer (510), MRL timing (512), MRL management layer (514) and MRL control (516) to duplex 802.11 RAT and an LTE RAT in the WTRU.

In order to support a LTE-based downlink (530, 535) as required for this scenario, LTE related control and feedback information is transmitted to a base station in the uplink. An active uplink connection may be open at the WTRU that may be used to transmit this information. This may be accomplished by allocating a "normal" transport channel in the uplink and not sending any user data over such a channel. However, this approach may have certain implementation issues that should be avoided. For example, the allocation of a transport channel is associated with reservation of memory (for storage associated with hybrid automatic repeat request (HARQ) and MAC/radio link control (RLC) segmentation/de-segmentation) as well as other resources at both the transmitter and receiver. These highly limited resources may be wasted. There are several means by which this wastefulness of resources may be mitigated, as described below.

In one scenario, a null transport channel (545), shown as LTE-PHY (540) that does not have a corresponding MAC component, is defined. A null transport channel is a channel which, by definition, cannot carry any data. Because the null transport channel cannot carry data, no resources (for example, and not limited to memory, data structures, and the like) associated with data transmission may be associated with such a channel. However, the setup of such a channel will necessarily cause physical layer signaling to be enabled.

In another scenario, existing resources (for example, and not limited to memory, data structures, and the like) are used with minimal impact. Within the existing standard definitions, a transport channel with minimal transmission capability may be defined to minimize the load on available resources.

Figure 6:
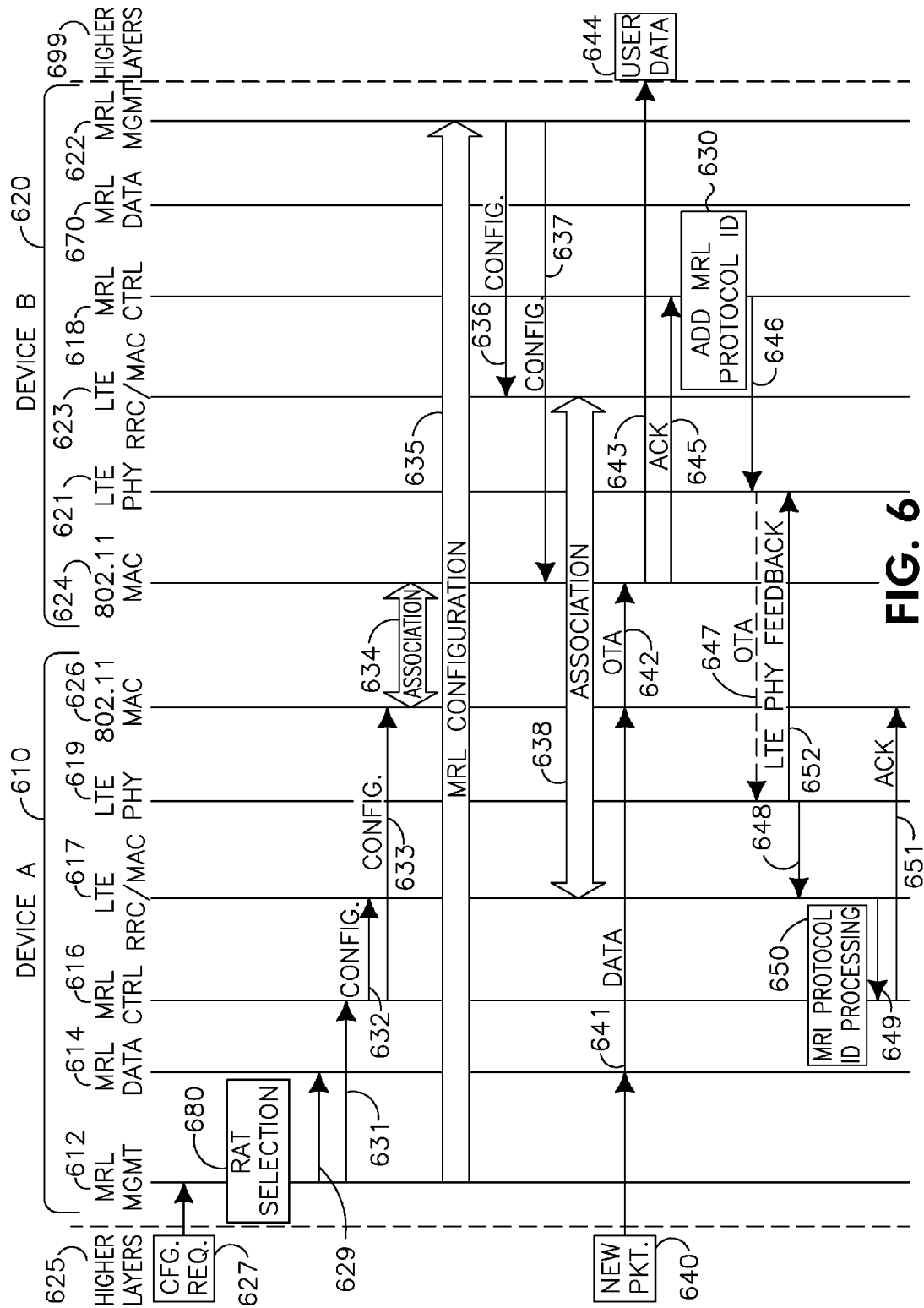
FIG. 6 illustrates a message sequence diagram showing multi-RAT communications sequences.

FIG. 6 illustrates an example of a message sequence diagram for communication between two devices, device A (610) and device B (620), showing a multi-RAT communications sequence in connection with this embodiment and includes example signaling between the device A (610) including: higher layers (625), an MRL management entity (612), an MRL data entity (614), an MRL control entity (616), an LTE RRC/MAC (617), an LTE PHY (619), and an 802.11 MAC (626); device B (620) including: an 802.11 MAC (624), an LTE PHY (621), an LTE RRC/MAC (623), an MRL control entity (618), an MRL data entity (670), an MRL management entity (622), and higher layers (699).

Device A (610) represents a client node (for example, a WTRU) and device B (620) represents an infrastructure node (for example, a base station or an access point). As an example of a WTRU-initiated connection, the higher layers in device A (610) (for example, the application/transport/network layers) initiate communication using the MRL entity by sending a configuration request (627) to the MRL management entity (612). The configuration request may include desired QoS parameters including data rate, maximum and desired latency, bit error rate, and on the like. Beginning at system initialization, the MRL management entity (612) maintains relevant information regarding the channel conditions, load, utilization, and the like on each RAT and uses this information to select an appropriate RAT (shown as RAT SELECTION (680)) that may be able to support the requirements specified in the configuration request. The MRL management entity (612) proceeds to configure via message (629) to the MRL Data entity 614) and message (631) to the MRL control entity (616) with the selection decision and the selected downlink and uplink RAT(s) using RAT-specific SAPs (shown as configuration messages 632 to the LTE RRC/MAC (617) and message 633 to the 802.11 MAC(626)). The RAT configured as the uplink RAT, in this case 802.11 MAC (626), initiates association with its peer, 802.11 MAC (624), allowing the MRL management layer (612) to send configuration message (635) on the uplink to its peer MRL management entity (622) on device B (620). The MRL management entity (622) in device B (620) completes the initial configuration by configuring the downlink RAT via message (636) to the LTE RRC/MAC (623) and via message 637 to the 802.11 MAC (624), and triggering a connection establishment (shown as ASSOCIATION (638)).

In another scenario, both uplink and downlink connection establishment may be initiated by the user device, and the MRL configuration is relayed after the initial connections are established. In both cases, the connection establishment message may need to carry additional information to indicate the required direction of connection requested from each RAT.

Referring to FIG. 6, a user-plane uplink frame (new packet (640)) initiating at device A (610) is sent to the MRL data layer (614), which sends it to the selected uplink RAT, 802.11 MAC (626) via message (641). The frame (new packet (640)) is sent over the air (642) using 802.11 physical layer protocols to the 802.11 MAC (624) peer in device B (620). The frame is processed by 802.11 MAC (624) and forwarded to the higher layers (699) using normal operating procedures and received as user data (644). The acknowledgement frame (645) is sent to the MRL control entity (618), which encapsulates the acknowledgement with a MRL protocol ID (630) and sends it to the flows associated downlink RAT (in this example, LTE) via a message (646) to the LTE PHY (621). The encapsulated frame is sent over-the-air (647) using LTE transmission mechanisms, and is received by the uplink at LTE PHY (619) which sends it to the LTE RRC/MAC (617) via message (648). The LTE RRC/MAC (617) recognizes the MRL Protocol ID (630) and forwards the MRL Protocol ID (630) to the MRL control entity (616) via message (649). The MRL control entity (616) processes (650) including de-encapsulation, and forwards the acknowledgement message (651) to 802.11 MAC (626) in device A (610) to complete its frame transmission. The LTE may also send physical layer feedback signaling (652) from LTE PHY (619) to the corresponding LTE PHY (621) in device B (620), including hybrid ARQ feedback and/or CQI information to ensure proper functioning of the LTE physical layer.

Figure 7:
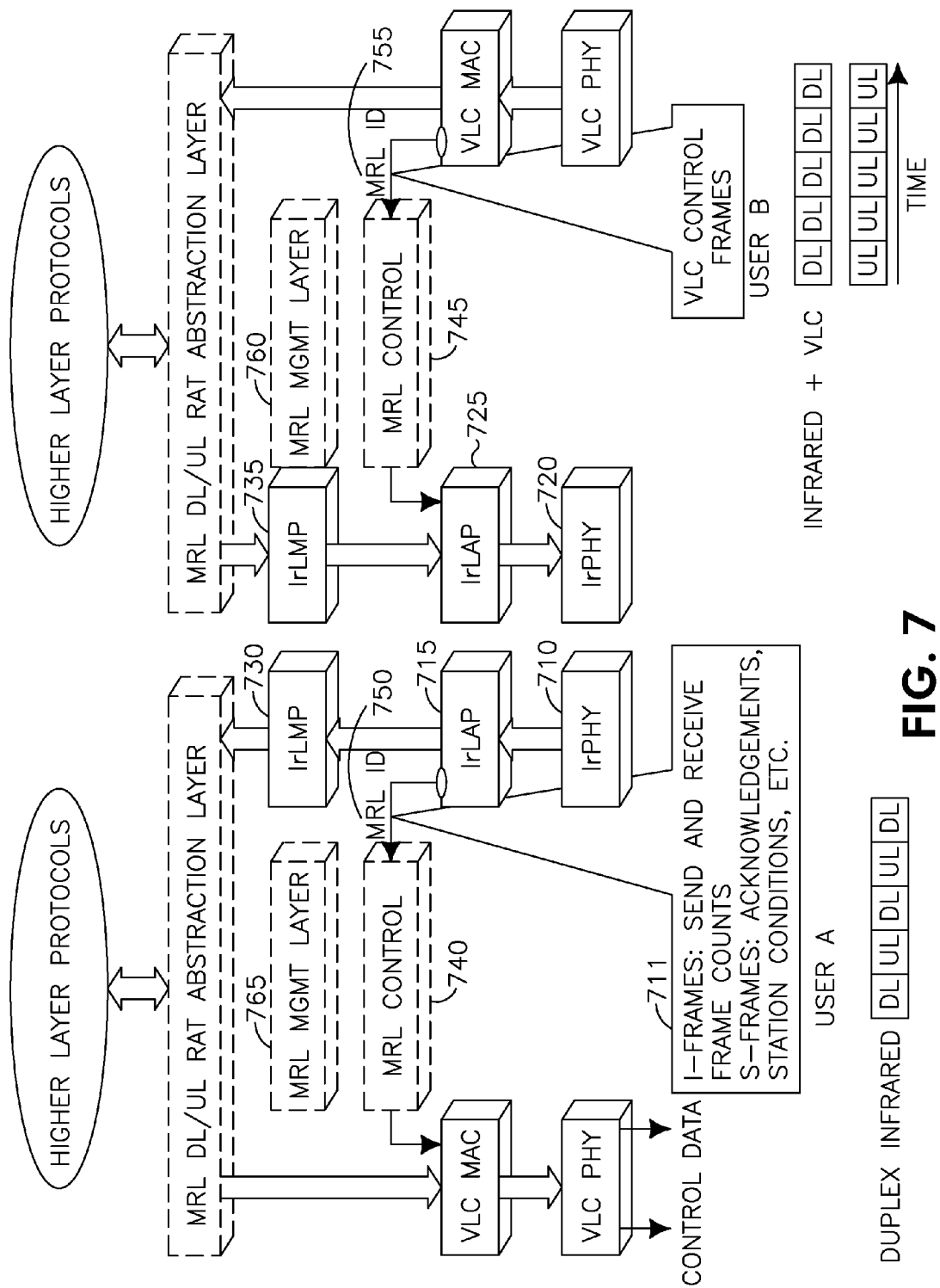
FIG. 7 illustrates an example of a visible light and infra-RED duplex solution for multi-RAT communications.

Another embodiment utilizing visible light and infraRED duplex is illustrated in FIG. 7. Referring to FIG. 7, the infraRED stack has the following components of interest: infrared physical layer specification (IrPHY) (710, 720), infrared link access protocol (IrLAP) (715, 725), and infrared link management protocol (IrLMP) (730, 735). The IrLAP (715, 725) is responsible for acknowledgments and flow control, and hence would need hooks to the MRL control (740, 745) to send and receive feedback frames like I-frames and S-frames (711).

The IrLAP (715, 725) represents the data link layer (DLL) of the open systems interconnection (OSI) reference model, and provides access control, discovery, connection establishment, and negotiation of QoS parameters. It needs to be appropriately configured to distinguish data and control frames and encapsulate control frames with MRL Protocol Identifier (750, 755). It further needs (with the consultation from MRL Timing component, not shown in FIG. 7) to ensure that VLC feedback packets timing restrictions are met. As shown in FIG. 7, the infraRED and VLC solution allows the infraRED time-slots to be fully utilized by infraRED. The IrLMP (730, 735), in conjunction with the MRL management layer (760, 765), manages scheduling and multiplexing of multiple logical channels.

Figure 8:
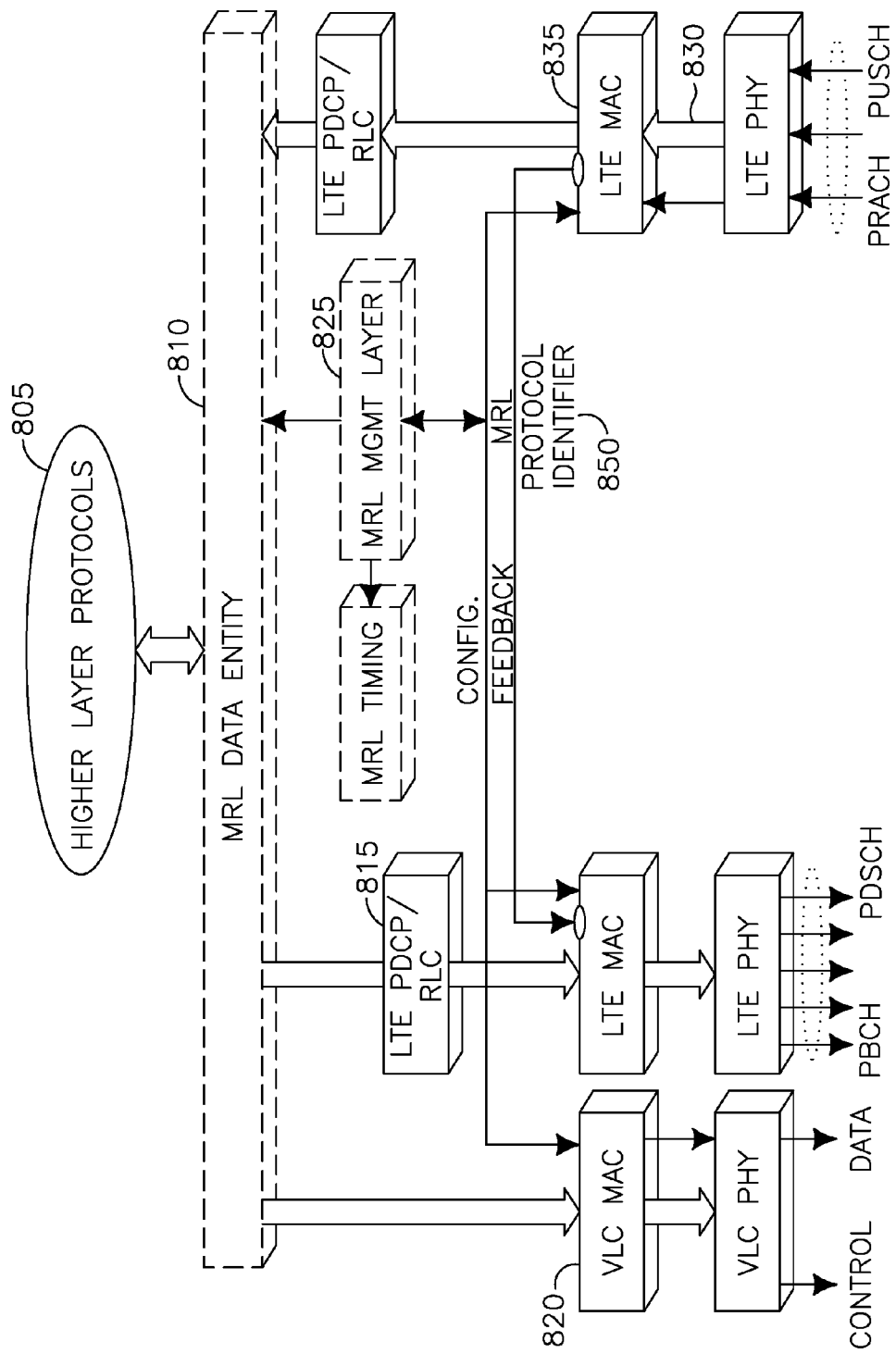
FIG. 8 illustrates an example spectrum aggregation in the downlink through data splitting at the MRL data entity.

Another embodiment utilizes VLC and LTE with spectrum aggregation and is shown in FIG. 8. MRL allows increased spectrum usage and interference mitigation by using alternate bands when additional bandwidth is required.

Referring to FIG. 8, the device (e.g., a wireless transmit/receive unit (WTRU)) is using LTE as a duplex channel for control and data communication. Furthermore, additional bandwidth is provided in the downlink by using the VLC channels. The UL-LTE continues to provide feedback transport for the VLC channel, as shown by the links in FIG. 8. This embodiment demonstrates how spectrum aggregation and traffic offloading may be enabled using the multiplexing/demultiplexing functionality of the multi-RAT data entity. Traffic from the higher-layer protocols (805) gets multiplexed into the two RATs (LTE PDCP/RLC (815) and the VLC MAC) (820) by the MRL data entity (810), based on input from the MRL management entity (825), which takes into account considerations including load balancing, resource availability, channel conditions, etc. Also in this example, the primary RAT MAC (LTE in this case) is present in both directions uplink and downlink, and thus feedback messages from the primary RAT are being sent directly into the LTE MAC (835) in the other direction (830).

Figure 9:
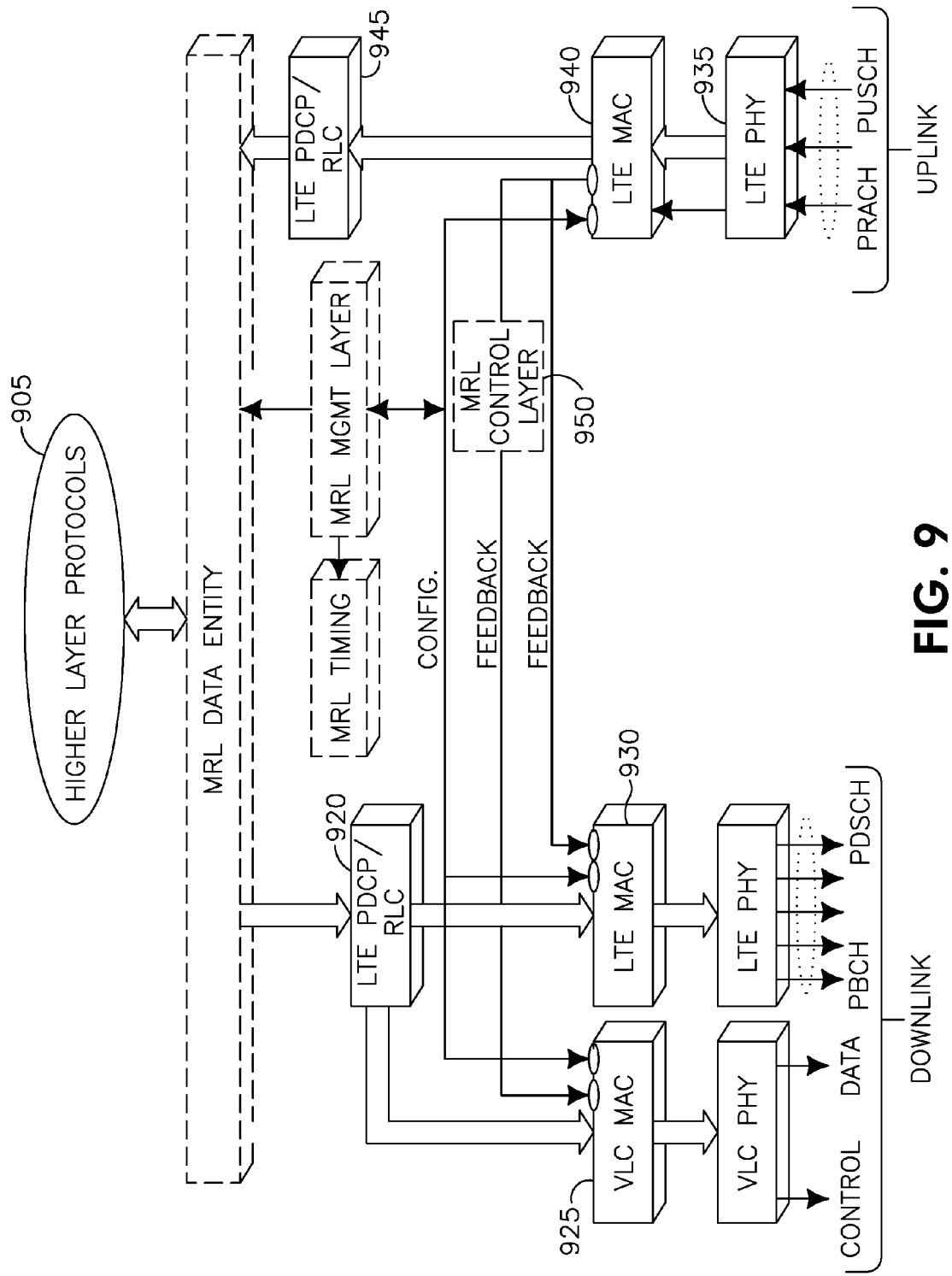
FIG. 9 illustrates an example spectrum aggregation in downlink through data-splitting at the LTE RLC layer.

FIG. 9 shows another use-case of the hot spot, wherein the data for the different RATs is split at the LTE RLC/PDCP (920). This embodiment shows the LTE RAT incorporating the secondary RAT within its architecture, hence requiring the secondary RAT resource blocks to be provisioned by primary (LTE) control messages including scheduling information (channel access opportunities and duration), radio resource control (RRC) messaging (e.g., transport and physical channel control information such as channel bandwidth, rate, and quality), and the like. It also is possible to use the null transport channel (545) as a primary LTE RAT, i.e., use the LTE RAT only for control signaling, and use the secondary RAT for sending/receiving user data. The higher layer protocols (905) send the traffic to the LTE PDCP/RLC entity (920), which splits the traffic into the LTE MAC (925) and the VLC MAC (930) entities. If the device represented is a base station, the combined LTE and VLC RATS are used in downlink direction and the LTE (935) is used in the uplink direction. The feedback messages for the VLC RAT are encapsulated using the MRL protocol identifier (850) and sent on the uplink on the LTE channel. At the base station, the encapsulated feedback messages are processed by the MRL control layer (950) and sent to the VLC MAC (925). Normal operation is assumed for the HARQ feedback, and the protocol feedback messages are directly sent from the downlink LTE-MAC (930) to the uplink LTE-MAC (940).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of multi radio access technology (multiRAT) communication, the method comprising:
   receiving, at a multi radio access technology layer (MRL) entity via a first physical (PHY) layer type, a first medium access control (MAC) data packet of a first protocol type,
   selecting the second protocol type based on at least one MRL protocol identifier (ID);
   encapsulating, at the MRL entity, the first MAC data packet of the first protocol type in a second MAC data packet of the second protocol type, wherein the first protocol type and the second protocol type are not a same protocol type; and
   transmitting, from the MRL entity via a second PHY layer type, the second MAC data packet of the second protocol type, wherein the first PHY layer type and the second PHY layer type are not a same PHY layer;
   wherein further receiving, at the MRL entity via the first PHY layer type, a first acknowledgement frame associated with the first protocol type.

2. The method of claim 1, wherein the first MAC data packet of the first protocol type comprises at least one of control information or feedback information associated with the first protocol type.

3. The method of claim 1, further comprising adding at least one MRL ID to the second MAC data packet of the second protocol type.

4. The method of claim 1, wherein the first PHY type is associated with a first radio access technology, wherein the second PHY layer type is associated with a second RAT, and wherein the first RAT and the second RAT are not a same RAT.

5. A wireless transmit receive unit (WTRU) comprising:
   a multi radio access technology layer (MRL) entity configured to receive, via a first physical (PHY) layer type, a first medium access control (MAC) data packet of a first protocol type; the MRL entity further configured to select a second protocol type based on at least one MRL protocol identifier (ID);
   the MRL entity further configured to encapsulate the first MAC data packet of the first protocol type in a second MAC data packet of the second protocol type, wherein the first protocol type and the second protocol type are not the same protocol type; and
   the MRL entity further configured to transmit, via a second PHY layer type, the second MAC data packet of the second protocol type, wherein the first PHY layer type and the second PHY layer type are not a same PHY layer type;
   wherein further receiving, at the MRL entity via the first PHY layer type, a first acknowledgement frame associated with the first protocol type.

6. The WTRU of claim 5, wherein the first MAC data packet of the first protocol type comprises at least one of control information or feedback information associated with the first protocol type.

7. The WTRU of claim 5, further comprising adding at least one MRL ID to the second MAC data packet of the second protocol type.

8. The WTRU of claim 5, wherein the first PHY type is associated with a first radio access technology, wherein the second PHY layer type is associated with a second RAT, and wherein the first RAT and the second RAT are not a same RAT.

* * * * *

UNITED STATES PATENT AND TRADEMARK OFFICE
CERTIFICATE OF CORRECTION

| | | |
|---|---|---|
| PATENT NO. | : 9,295,092 B2 | Page 1 of 1 |
| APPLICATION NO. | : 12/859863 | |
| DATED | : March 22, 2016 | |
| INVENTOR(S) | : Kaur et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 441 days.

Signed and Sealed this
Nineteenth Day of July, 2016

Michelle K. Lee
*Director of the United States Patent and Trademark Office*